United States Patent [19]

Brockmann

[11] Patent Number: 4,776,163

[45] Date of Patent: Oct. 11, 1988

[54] GAS TURBINE POWER UNIT

[75] Inventor: Heinz Brockmann, Bad Homburg, Fed. Rep. of Germany

[73] Assignee: Kloeckner-Humboldt-Deutz AG, Fed. Rep. of Germany

[21] Appl. No.: 67,654

[22] Filed: Jun. 26, 1987

[30] Foreign Application Priority Data

Jul. 1, 1986 [DE] Fed. Rep. of Germany ....... 3622022

[51] Int. Cl.[4] .............................................. F02C 7/36
[52] U.S. Cl. .................................. 60/39.161; 60/39.33; 74/DIG. 5
[58] Field of Search ........... 60/39.142, 39.161, 39.163, 60/39.33; 74/661, DIG. 5

[56] References Cited

U.S. PATENT DOCUMENTS

| | | | |
|---|---|---|---|
| 2,696,711 | 12/1954 | Marchant et al. | 60/39.142 |
| 2,803,943 | 8/1957 | Rainbow | 60/39.161 |
| 2,823,320 | 2/1958 | Larsson et al. | 60/39.161 |
| 3,100,378 | 8/1963 | Austin et al. | 60/39.161 |
| 3,680,309 | 8/1972 | Wallace | 60/39.161 |

FOREIGN PATENT DOCUMENTS 703262 2/1954 United Kingdom .

*Primary Examiner*—Louis J. Casaregola
*Attorney, Agent, or Firm*—Charles L. Schwab

[57] ABSTRACT

A gas turbine drive (1) is presented, for which an auxiliary device power unit (16) can be coupled alternately with the low-pressure rotor (2) or the high-pressure rotor (3).

12 Claims, 1 Drawing Sheet

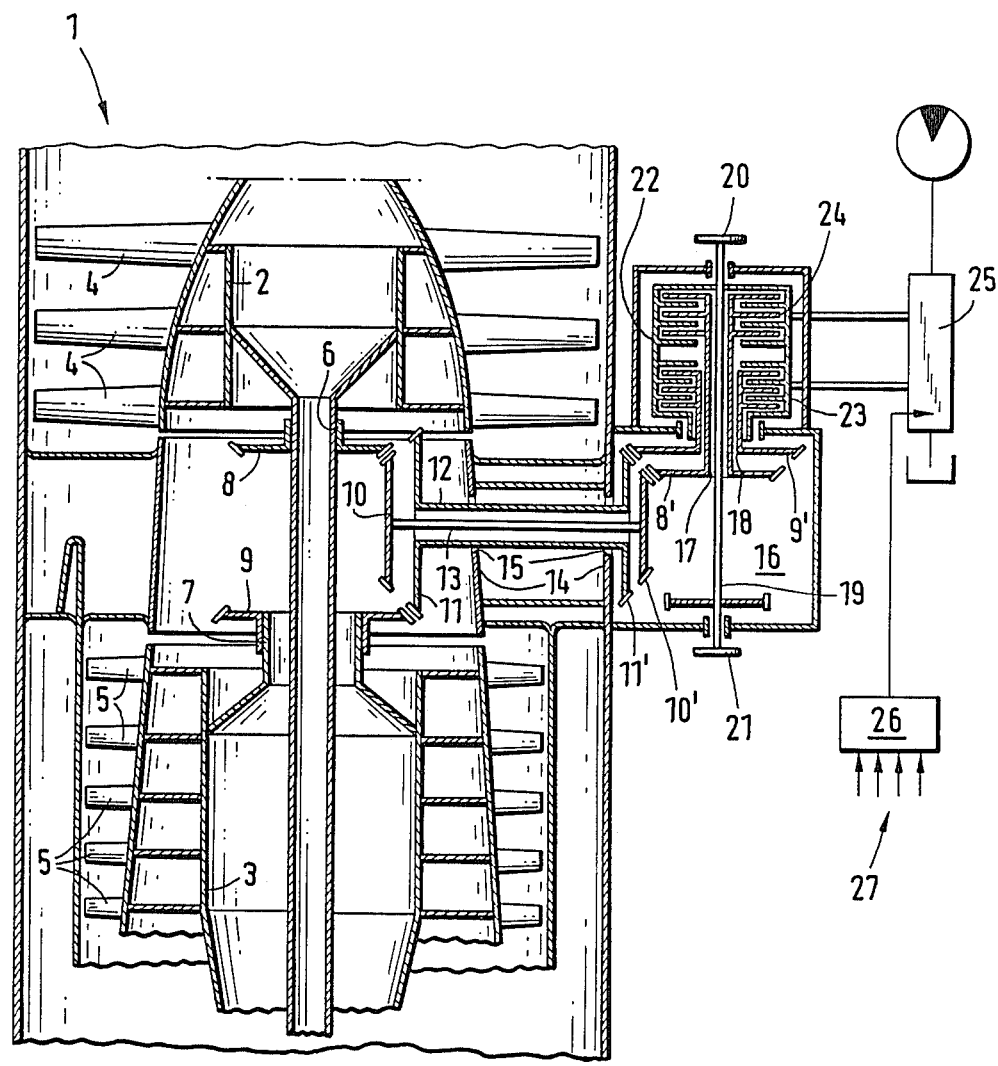

GAS TURBINE POWER UNIT

TECHNICAL FIELD

This invention relates to a gas turbine power unit wherein an auxiliary device is driven by either a high pressure rotor or a low pressure rotor.

PRIOR ART STATEMENT

British Pat. No. 703,262 shows a gas turbine with an auxiliary device driven by either of a high-pressure rotor or a low-pressure rotor of a gas turbine power unit wherein whichever rotor is rotating faster is connected to the auxiliary device drive. The slowly running rotor is separated from the auxiliary device drive by means of a "free-wheel" mechanism. Thus, the rotor shaft which is rotating more rapidly basically forms the driving shaft for the auxiliary device drive.

In general, the secondary power output necessary for operating the auxiliary device is taken from the high-pressure rotor. This is accomplished through the normally high speeds of this rotor, which results in the fact that the high-pressure rotor must, during the start-up of the gas turbine drive, be accelerated at first by means of a starter, and the starter is in most cases installed at an auxiliary device drive.

During flight, however, flight conditions occur which are critical for the gas turbine power unit, in the course of which the withdrawal of secondary power from the high-pressure motor is disadvantageous. If, for instance, acceleration must occur when there is only a partial load, the high-pressure rotor must first be brought up to high speeds, a process which is disadvantageously influenced by a simultaneous withdrawal of power from the secondary power output. In addition, the high-pressure rotor can, at great flying heights and with low flight speeds, be driven up near the pump limit and the combustion chamber operated to near the quench limit, so that here as well an additional undesired power output occurs. All of these operating parameters are not taken into consideration for the gas turbine power unit described in British Pat. No. 703 262 as pertains to the drop in secondary output needed for driving the auxiliary device drive.

OBJECTS AND BRIEF SUMMARY OF THE INVENTION

An object of the invention is to guarantee safe operation of the gas turbine power unit under operating conditions for a gas turbine drive with at least one auxiliary device which is driven by a high-pressure rotor or a low-pressure rotor, whereby the auxiliary device can be driven at any time with the required energy.

This object is met by the gas turbine power unit of this invention because of the fact that the rotor-side drive of the auxiliary device drive can be switched by a double coupling which can be operated by remote-control. In this way, the auxiliary device drive can be switched from the high-pressure rotor to the low-pressure rotor, or vice versa. In this way, for example, the auxiliary device drive can be switched early on to the low-pressure rotor whenever critical flight conditions are indicated, in order to transfer the energy which is generated in the high-pressure rotor exclusively into the thrust. As a result, critical conditions as pertain to the power output supply to the auxiliary drives are also safely avoided, since any "dying" of the rotor is safely avoided because of the predictable switching of the auxiliary device drive.

In another embodiment of the invention, the double coupling which can be operated by remote control is designed as a hydraulically switchable multiple-disc lamellar coupling. This coupling design has proven itself to be particularly reliable and operable with a low expenditure of device-related technology. A hydraulic circuit is provided for each gas turbine power unit, so that in order to actuate the multiple-disc lamellar coupling, only a correspondingly controlled hydraulic circuit has to be provided.

An advantageous mechanical solution for driving the auxiliary device drive may include a second shaft arranged concentrically vis-a-vis a first shaft which is connected with the high-pressure rotor via a bevel gear drive, which is driven constantly by the low-pressure rotor via a second bevel gear drive. Through the concentric arrangement of both shafts, only a small amount of space is needed for transmitting the mechanical energy from the gas turbine power unit. In addition, the arrangement of the shafts which are concentric with respect to each other within the gas turbine power unit casing is simple and the sealing of the shaft through-passages to the gas turbine casing is uncomplicated.

In another embodiment of the invention, the double coupling and/or that of the hydraulic switching circuit which actuates the double coupling is actuated by an electronic control mechanism. All of the parameters which must be taken into consideration when deciding on which rotor the auxiliary device drive should be coupled with are processed in the electronic control mechanism. The following are required as important parameters: the speeds of the high-pressure and low-pressure rotors, rate of the fuel supply to the combustion chambers of the gas turbine power unit, the air pressure at the inlets and outlets of the low-pressure and the high-pressure rotor, as well as the moments of torque of the low-pressure rotor, the high-pressure rotor, and the auxiliary device drive. These values, which can be supplemented by additional measured parameters (such as temperatures) as needed, are compared with the values which have accumulated in the electronic control mechanism and corresponding switching commands are transmitted to the double coupling.

BRIEF DESCRIPTION OF THE DRAWINGS

Additional characteristics and advantages of the invention will be apparent from the following drawing description, in which:

The single drawing FIGURE is a schematic longitudinal section of a gas turbine power unit incorporating one embodiment of the invention.

DETAILED DESCRIPTION OF THE DRAWINGS

The partially represented gas turbine power unit 1 includes a low-pressure rotor 2 and a high pressure rotor 3. At the outer circumference of the low-pressure rotor 2 and the high-pressure rotor 3, a plurality of blades 4, 5 have been fastened, respectively. The rotors 2, 3 are fastened, respectively to a low-pressure rotor shaft 6 and to a high-pressure rotor shaft 7. In the area between the low-pressure rotor 2 and the high-pressure rotor 3, a first pair of coaxial bevel gears 8, 9 are arranged, displaced axially with respect to each other, on the rotor shafts 6, 7, whereby the bevel gears 8, 9 mesh with a second pair of bevel gears 10, 11. The second pair of bevel gears 10, 11 are disposed by 90 degrees to the first bevel gears 8, 9, along a common axis of rotation. Bevel gears 10, 11 are respectively fastened to the radially inner ends of shafts 12, 13 which are arranged concentrically with respect to each other and extend radially in relation to the rotors 2, 3. The first or outer shaft 12, is a quill shaft supporting the bevel gear 11, which meshes with bevel gear 9, fastened to high-pressure rotor shaft 7. Correspondingly, shaft 13, which extends through the quill shaft 12, is connected mechanically via the bevel gears 10 and 8 with low-pressure rotor shaft 6. The first shaft 12 and the second shaft 13 are supported within the gas turbine power unit casing 14, and mechanically transmit torque from rotors 2, 3 through an opening 15 into an auxiliary device drive 16. Within auxiliary device drive 16, the direction of power transmitted by shafts 12 and 13 is shifted 90 degrees to an axis of rotation parallel to the low-pessure rotor shaft 6 and the high-pressure rotor-shaft 7 by sets of meshing bevel gears 8' 10' and 9', 11'. Bevel gears 8', 9' are in turn fastened to clutch input shafts 17 and 18. The clutch input shaft 17 which supports bevel gear 8' is ultimately connected with the low-pressure rotor shaft 6, and the clutch input shaft 18, which supports bevel gear 9', is ultimately connected with the high-pressure shaft 7. A clutch output shaft 19 is arranged within the auxiliary device drive 16 concentrically both clutch input shafts 17 and 18. The clutch output shaft 19 provides ends 20 and 21, which extend axially from opposite ends of the auxiliary device drive casing, which are adapted for driving connection to a discretionary number of auxiliary devices.

In addition, a hydraulically actuated multiple-disc double clutch 22 is arranged within the auxiliary device drive 16. Because of this, the clutch output shaft 19 can be connected for operation with the high-pressure rotor shaft 7 via a first lamellar multiple disc pack 23, or, alternatively, the clutch output shaft 19 can be connected for operation with the low-pressure rotor shaft 6 via the second lamellar multiple disc pack 24. The multiple-disc power operated double clutch 22 can be switched by an hydraulic switching circuit 25 including a control valve which is not represented in detail, which in turn is actuated or controlled by an electronic control mechanism 26 which is also not represented in detail. In doing so, the electronic control mechanism processes as inlet parameters, for instance, the speeds of low-pressure rotor 2 and high-pressure rotor 3, the rate of the fuel delivery to the combustion chamber or combustion chambers of the gas turbine power unit 1, the air pressure at the inlet and outlet of the low-pressure rotor 2 and the high-pressure rotor 3 as well as the torque or speed of the low-pressure rotor 2 and the high-pressure rotor 3 and the clutch output shaft 19 of auxiliary device drive 16. The corresponding values are recorded by sensors and led to electronic control mechanism 26.

I claim:

1. A gas turbine power unit (1) with one high-pressure rotor (3) and one low-pressure rotor (2) having power transmitting means by which at least one auxiliary device can be driven alternately by the high-pressure rotor (3) or the low-pressure rotor (2) via an auxiliary device drive (16) characterized by
    an hydraulically actuated multiple disc double clutch (22) operatively associated with said auxiliary device drive (16) and having a clutch output shaft (19) adapted for connection to said auxiliary device, said clutch being operable to alternately connect one or the other of said high-pressure and low-pressure rotors to said clutch output shaft and
    a clutch control operatively associated in controlling relation with said double clutch whereby a selected one of said high-pressure and low-pressure rotors is connected in torque transmitting relation to said clutch output shaft through said auxiliary device drive.

2. The gas turbine power unit of claim 1 wherein said clutch control includes a remote control responsive to operating parameters of said gas turbine power unit.

3. The gas turbine power unit of claim 2 wherein said remote control is fed electronic signals from the gas turbine power unit indicative of operating parameters thereof whereby said clutch is operated automatically in response to said signals.

4. A gas turbine power unit (1) with one high-pressure rotor (3) and one low-pressure rotor (2) having power transmitting means by which at least one auxiliary device can be driven alternately by the high-pressure rotor (3) or the low-pressure rotor (2) via an auxiliary device drive (16) characterized by
    said auxiliary device drive (16) including a first pair of bevel gears (9, 8) concentrically secured to said high-pressure and low-pressure rotors (3, 2), respectively, a pair of concentric shafts (12, 13) extending radially outward from said rotors, and a second pair of bevel gears (11, 10) meshing, respectively, with said first pair of bevel gears (9, 8) and secured, respectively, to the radially inner ends of said concentric shafts (12, 13),
    a double clutch (22) operatively associated with said auxiliary device drive (16) and having a clutch output shaft (19) adapted for connection to said auxiliary device, said clutch being operable to alternately connect one or the other of said high-pressure and low-pressure rotors to said clutch output shaft and
    a clutch control operatively associated in controlling relation with said double clutch whereby a selected one of said high-pressure and low-pressure rotors is connected in torque transmitting relation to said clutch output shaft through said auxililary device drive.

5. The gas turbine power unit of claim 4 wherein one of said concentric shafts is a quill shaft and the other of said concentric shafts extends through said quill shaft.

6. The gas turbine power unit of claim 5 wherein said double clutch includes first and second input shafts, two pair of bevel gear sets interconnect said concentric shafts and said input shafts of said double clutch and wherein said clutch output shaft is parallel to said rotors.

7. The gas turbine power unit of claim 6 wherein said double clutch is a hydraulically actuated multiple disc clutch.

8. The gas turbine power unit of claim 7 wherein said clutch control includes a remote control responsive to operating parameters of said gas turbine power unit.

9. The gas turbine power unit of claim 8 wherein said remote control is electronic and is fed electronic signals indicative of engine operating parameters whereby said double clutch is actuated automatically in response to said engine operating parameters.

10. A gas turbine power unit (1) with one high-pressure rotor (3) and one low-pressure rotor (2) having power transmitting means by which at least one auxiliary device can be driven alternately by the high-pressure rotor (3) or the low-pressure rotor (2) via an auxiliary device drive (16) characterized by
  a power operated double clutch (22) operatively associated with said auxiliary device drive (16) and having a clutch output shaft (19) adapted for connection to said auxiliary device, said clutch being operable to alternately connect one or the other of said high-pressure and low-pressure rotors to said clutch output shaft and
  a clutch control including a switching circuit operatively associated in controlling relation with said power operated double clutch whereby a selected one of said high-pressure and low-pressure rotors is connected in torque transmitting relation to said clutch output shaft through said auxiliary device drive.

11. The gas turbine power unit of claim 10 wherein said clutch control includes a remote control mechanism (26) responsive to operating parameters of said gas turbine power unit.

12. The gas turbine power unit of claim 11 wherein said remote control mechanism (26) is electronic and is fed electronic signals indicative of engine operating parameters whereby said double clutch is actuated automatically in response to said engine operating parameters.

* * * * *